United States Patent
Takase et al.

(10) Patent No.: US 7,032,098 B2
(45) Date of Patent: Apr. 18, 2006

(54) DATA-DRIVEN TYPE INFORMATION PROCESSING APPARATUS AND INFORMATION PROCESSING METHOD ALLOWING FOR EFFECTIVE USE OF MEMORY

(75) Inventors: Motoki Takase, Yamatokoriyama (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 456 days.

(21) Appl. No.: 10/286,856

(22) Filed: Nov. 4, 2002

(65) Prior Publication Data

US 2003/0097540 A1 May 22, 2003

(30) Foreign Application Priority Data

Nov. 16, 2001 (JP) ............................. 2001-351312

(51) Int. Cl.
*G06F 12/00* (2006.01)
(52) U.S. Cl. .................... 711/220; 711/200; 712/26; 712/27
(58) Field of Classification Search ............... 711/200, 711/220; 712/26, 27
See application file for complete search history.

(56) References Cited

U.S. PATENT DOCUMENTS 5,526,502 A   6/1996  Yoshida et al.
5,848,290 A * 12/1998  Yoshida et al. ............... 712/26
5,956,517 A *  9/1999  Okamoto et al. ............. 712/1
6,317,817 B1* 11/2001  Shichiku et al. ............ 711/202
6,373,410 B1*  4/2002  Ishikura et al. .............. 341/61

FOREIGN PATENT DOCUMENTS

JP        5-274213 A    10/1993

OTHER PUBLICATIONS

Kanekura, Hiroshi et al., "An Evaluation of Parallel-Processing in the Dynamic Data-Driven Processors", Microcomputer Architecture Symposium, pp. 9-18, (1991).

* cited by examiner

*Primary Examiner*—Donald Sparks
*Assistant Examiner*—Bao Que Truong
(74) *Attorney, Agent, or Firm*—Birch, Stewart, Kolasch & Birch, LLP

(57) ABSTRACT

A data-driven type information processing apparatus includes at least a paired data generating unit, a memory control unit, and data memory. The memory control unit includes a pipeline register receiving a data packet output from the paired data generating unit, including a page address, a set value for setting an effective bit and data, and an address generating unit for generating an address for accessing the data memory by retrieving effective data from the data included in the data packet based on the set value and attaching the page address included in the data packet to the retrieved effective data.

15 Claims, 8 Drawing Sheets

F I G. 1 0
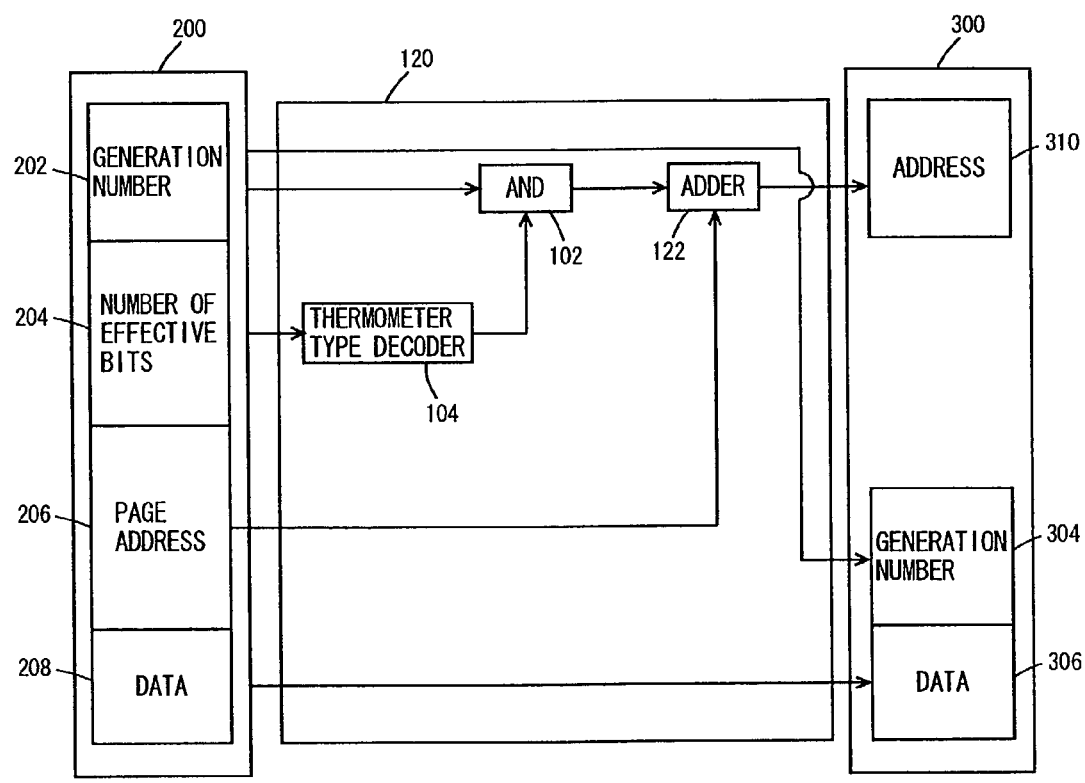

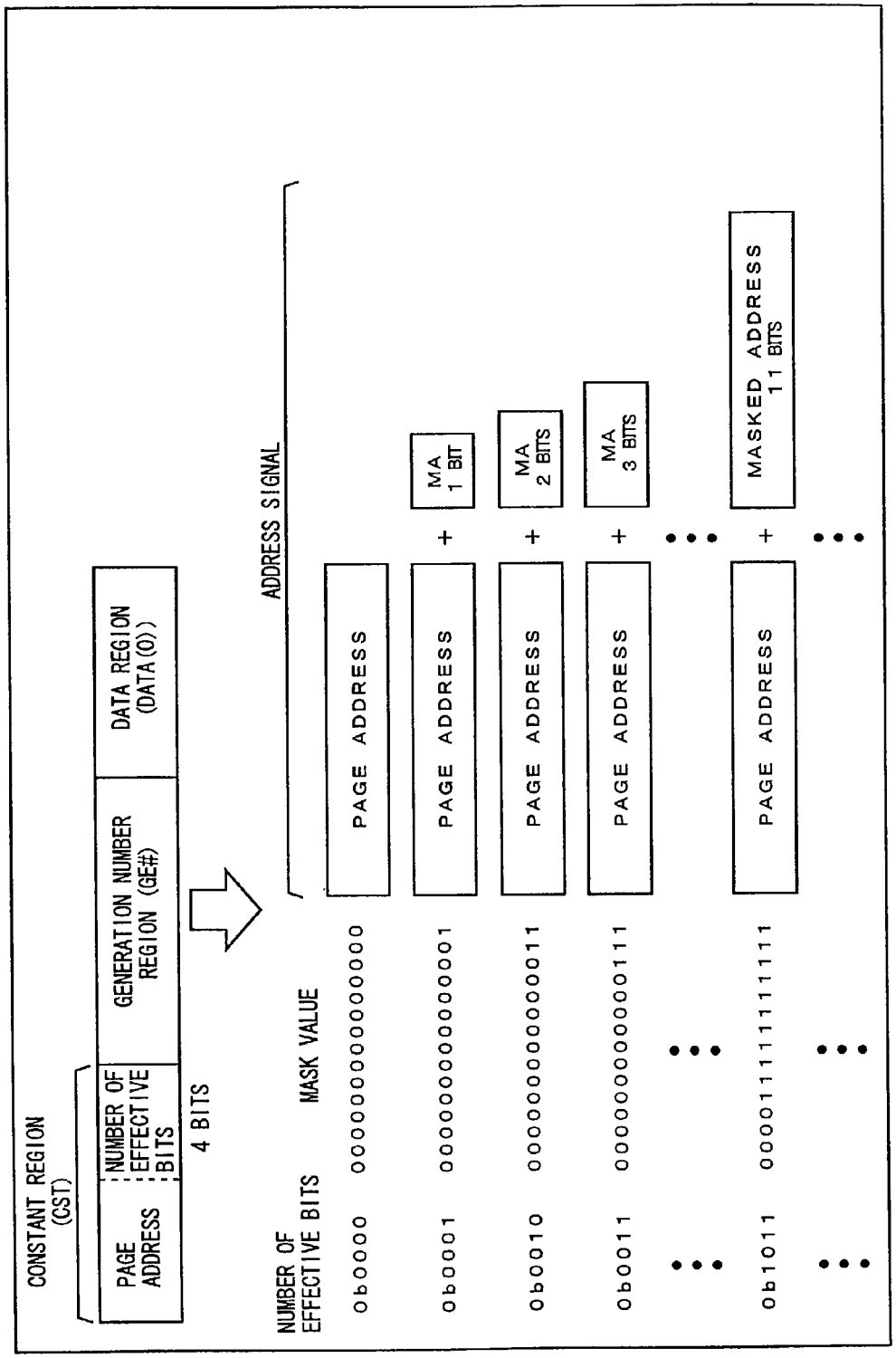

DATA-DRIVEN TYPE INFORMATION PROCESSING APPARATUS AND INFORMATION PROCESSING METHOD ALLOWING FOR EFFECTIVE USE OF MEMORY

BACKGROUND OF THE INVENTION

1. Field of the Invention

The present invention relates to a memory control unit responsive to an input data packet input from a data-driven type processor for accessing image memory to output the result therefrom. More particularly, the present invention relates to a memory control unit responsive to an input data packet output from a dynamic data-driven type processor and having a generation number allotted in order of input time for accessing the content of image memory or the like to output the result therefrom, using that generation number as an address.

2. Description of the Background Art

In recent years, there is a growing demand for improving an operation speed of a processor, for example, in the field of image processing or the like. Parallel processing is regarded as promising as one of solutions for such a faster processor. An architecture called a data-driven type has especially drawn attention among other architectures for parallel processing.

In the data-driven type processor, a process proceeds in accordance with a simple rule that "a process is performed once all sets of input data necessary for a certain process are collected and resources such as an arithmetic unit necessary for that process are allocated". A technique necessary for realizing this architecture includes a mechanism for detecting that all sets of input data are collected (firing). A system permitting only one set of input data for a process at the time of detecting the firing is referred to as a static data-driven type system and one permitting more than one sets of input data is referred to as a dynamic data-driven type system.

When time sequential data is processed, such as an image signal processing, the static data-driven type system cannot support the processing sufficiently and therefore it may be necessary to employ the dynamic architecture. In this case, since there are a plurality of input sets for a certain process, it is necessary to introduce a concept such as a generation identifier for identifying these plurality of input sets. In the following description, the generation identifier will be referred to as a generation number.

An exemplary data-driven type information processing apparatus for image processing as described above is shown in "An Evaluation of Parallel-Processing in the Dynamic Data-Driven Processor" (Information Processing Society of Japan, Microcomputer Architecture Symposium, Nov. 12, 1991).

Referring to FIG. 1, a system configuration of a data-driven type information processing apparatus will be described. As shown in FIG. 1, this system includes a data-driven type information processing apparatus 1000 and an image memory unit 1100. Image memory unit 1100 includes an image memory 1200 and a memory interface 1300. Data-driven type information processing apparatus 1000 has input ports 1002, 1004 respectively connected to data transmission paths 1006, 1008, output ports 1012, 1014 respectively connected to data transmission paths 1016, 1018, an output port 1022 connected to data transmission path 1026 to memory interface 1300, and an input port 1024 connected to data transmission path 1028 to memory interface 1300.

An input data packet having a generation number as an identifier that is attached in order of input time is time sequentially input through input ports 1002, 1004 to data-driven type information processing apparatus 1000. Data-driven type information processing apparatus 1000 stores a predetermined process, and a process is executed based on the stored content.

Memory interface 1300 receives through data transmission path 1026 an access request to image memory 1200 (a request for reference, updating or the like of data stored in the image memory) that is output from output port 1022 of data-driven type information processing apparatus 1000. Memory interface 1300 accesses image memory 1200 through a memory access control line and sends the result therefrom to input port 1024 of data-driven type information processing apparatus 1000 through data transmission path 1028.

Data-driven type information processing apparatus 1000 outputs an output data packet to data transmission paths 1016, 1018 through output ports 1012, 1014 after the processing for the input data packet is completed.

Referring to FIG. 2, an internal configuration of data-driven type information processing apparatus 1000 will be described. As shown in FIG. 2, data-driven type information processing apparatus 1000 includes a junction unit 1500, a firing control unit 1502 connected to junction unit 1500, a memory control unit 1504 connected to firing control unit 1502, an arithmetic unit connected to memory control unit 1504, a program storing unit 1508 connected to arithmetic unit 1506, and a branching unit 1510 connected to program storing unit 1508. Branching unit 1510 is also connected to junction unit 1500.

The input data packet input to input ports 1002, 1004 connected to data transmission paths 1006, 1008 is stored in firing control unit 1502 through junction unit 1500. Firing control unit 1502 has memory for queuing and queues the input data packet previously input in that memory until a data packet paired with the input data packet is input. Firing control unit 1502 passes the paired input data packets to memory control unit 1504 when these input data packets are collected. Memory control unit 1504 executes an access request to internal memory or image memory 1200 based on tag information or data included in the input data packet to reference or update the data stored in the memory. Arithmetic unit 1506 selects a processing in accordance with an instruction code included in the input data packet and executes an operation corresponding to the selected processing. The resultant operation is sent to program storing unit 1508. Program storing unit 1508 includes program memory storing an instruction code to be executed next and a node number. This node number is used as an address to execute an access to the program memory.

FIG. 3 shows a packet configuration of an input data packet. The input data packet includes an instruction code, a node number, a generation number, a right and left attribute flag, data (first data, second data, . . . ) in order from the upper bit. The instruction code is a code for specifying a stored instruction in order to read and execute the instruction stored in an instruction decoder. The node number is used as an address for referring to the instruction code stored in the program memory included in program storing unit 1508 with the node number. The generation number is used as an identifier for identifying the input data packet. It is noted that the generation number can also be used as an image address, and in this case, the generation number indicates a field number, a line number, and a pixel number in order from the upper bit.

In this system, when the internal memory functions as a look up table, the data stored in a data region or a generation number region has been used as address. When the internal memory is shared between a plurality of programs, a region is reserved for example in a portion of an instruction code in advance and the data stored in that region is attached as an identifier to the high order in the address as a page address. In this way, a usable range in the memory is determined based on a predetermined address for each program.

FIG. 4 shows a packet configuration of the data packet after firing, including a generation number (GE#), data (DATA (0)), and a constant (CST) in their respective storing regions. It is noted that in the data packet shown in FIG. 4, for the sake of clarity, the instruction code region, the node number region and data other than DATA (0) are not shown. As shown in FIG. 4, the lower bits (in this case 16 bits) of the address signal necessary for access to the memory is retrieved from the generation number region by masking the generation number (GE#) (MASKED ADDRESS). The page address (PA) stored in the lower three bits in the constant region is attached to the high order in MASKED ADDRESS as a page address to generate a 19-bit address signal for accessing the memory. In other words, a 16-bit generation number serves as the address for the memory and the lower three bits in the constant region are attached to the high order in that address as a page address, resulting in a 19-bit address signal.

In generating the address signal in this way, the page address has to be variable in order to utilize the memory region effectively by changing the number of pages or by changing the memory region divided by the pages. In this case, an operation is performed on the generation number, and based on the result of the operation, the memory is accessed.

FIG. 5 shows a flowchart of conversion to a 4-bit page address by increasing the page address by one bit, for the generation number of the input data packet as being input.

At step (abbreviated as S hereinafter) 1000, an input data packet is input through data transmission paths 1006, 1008. The input data packet as being input has a packet configuration as shown in FIG. 4. At S1002, AND operation of the generation number (GE#) and a first constant is executed. In this AND operation, the generation number (GE#) is ANDed with the first constant (0x7ff, 0111111111111111). Therefore, the generation number is rewritten, and the sixteenth bit (the most significant one bit) of the 16-bit generation number (GE#) masked and extracted is forced to be "0" for available for later use as a page address.

At S1004, an OR operation of the rewritten generation number and a second constant is executed. Here it is assumed that the sixteenth bit is converted to "1". The OR operation is executed in which the generation number (GE#) is ORed with the second constant (0x8000, 1000000000000000). Therefore, the generation number is rewritten and the sixteenth bit of the generation number is "1".

At S1006, TSEL instruction is executed. In this TSEL instruction, based on the 19-bit address signal having a third constant (a page address represented by the lower three bits in the constant region shown in FIG. 4) attached to the high order in the rewritten generation number, the internal memory is accessed and the data stored in the memory is referenced.

As shown in FIG. 6, such processing enables the internal memory to be accessed with an address formed of the first to fifteenth bits in the generation number region and a page address formed of the sixteenth bit of the generation number (GE#) included in the input data packet and the lower three bits in the constant region. In this way, a 3-bit page address is converted to four bits.

A fixed page address, however, cannot optimize the use of memory if the capacity of the memory for use in each process varies where a plurality of processes are combined in one application. For example, if the page address is 3-bit, the memory can be used only in eight ways regardless of the memory capacity for use when the memory is used in an application. Furthermore, as described above, for example conversion of three bits to four bits requires the process constituted with three instructions, resulting in the reduced processing speed.

SUMMARY OF THE INVENTION

An object of the present invention is to provide a data-driven type information processing apparatus and an information processing method without reducing a processing speed.

Another object of the present invention is to provide a data-driven type information processing apparatus and an information processing method allowing for effective use of memory.

A further object of the present invention is to provide a data-driven type information processing apparatus and an information processing method allowing for reduced processes for operating an address.

Still another object of the present invention is to provide a data-driven type information processing apparatus and an information processing method allowing for effective use of memory using mask data.

A data-driven type information processing apparatus in accordance with the present invention includes at least a paired data generating unit, a memory control unit, and data memory. The memory control unit includes an input circuit inputting data packet output from the paired data generating unit, a processing circuit retrieving effective data from data included in the data packet based on a set value, and a decision circuit connected to the processing circuit for deciding an address for accessing the data memory by attaching a page address included in the data packet to the retrieved effective data.

In accordance with the present invention, a data packet including a page address, a set value for setting an effective bit and data is input to the input circuit. The processing circuit retrieves effective data (a memory address) from data (for example, a generation number) included in the data packet based on the set value (for example, a set value representative of an effective bit). The decision circuit decides an address signal for accessing the data memory by attaching a page address to the retrieved memory address. Accordingly, no limitation is placed on the bit of the page address as in the conventional technique and the memory space can be divided into pages for effective use. In this case, an operation as in the conventional technique is not required. As a result, there can be provided a data-driven type information processing apparatus allowing for the effective use of the memory without reducing the processing speed.

More preferably, the decision circuit includes a circuit deciding an address for accessing the data memory by attaching the page address included in the data packet to the high order in the retrieved effective data.

In accordance with the present invention, the page address can be attached to the high order in the memory address that is the retrieved effective data. The data memory can be accessed with the page address of the upper bit and the address of the lower bit in the address signal.

More preferably, the decision circuit includes a circuit deciding an address for accessing the data memory by adding a page address included in the data packet to the retrieved effective data.

In accordance with the present invention, a page address can be added to the memory address that is a retrieved effective data. There is no limitation on the number of bits resulting from the number of bits of the page address added to the number of bits of the memory address. Therefore the memory space can be used more effectively.

More preferably, the processing circuit includes a circuit generating mask data for masking a specific bit in the data included in the data packet and a circuit retrieving effective data from the data included in the data packet based on the mask data.

In accordance with the present invention, a thermometer type decoder outputs a 15-bit mask value in accordance with a predetermined rule for a 4-bit set value. Based on this mask value, a memory address is retrieved.

More preferably, the data packet is configured with an instruction code region, a node region, a generation number region, a page address region, a data region, and an effective bit set value storing region.

In accordance with the present invention, the data packet in the data-driven type information processing apparatus is usually configured with an instruction code region, a node region, a generation number region, a page address region, and a data region. An address signal for accessing the data memory is decided by using the data packet having an effective bit set value storing region added to this configuration and attaching a page address to the memory address retrieved based on the set value included in the effective bit set value. Therefore, the memory can effectively be used without reducing the processing speed.

An information processing method in accordance with another aspect of the present invention is for use in a memory control unit of a data-driven type information processing apparatus including at least a paired data generating unit, a memory control unit and data memory. The information processing method includes the steps of inputting a data packet output from the paired data generating unit, retrieving effective data from data included in the input data packet based on a set value, and deciding an address for accessing the data memory by attaching a page address included in the data packet to the retrieved effective data.

In accordance with the present invention, at the step of inputting a data packet, a data packet including a page address, a set value for setting an effective bit and data is input. In the step of retrieving effective data, effective data (a memory address) is retrieved from the data (for example, a generation number) included in the data packet based on the set value (for example, a set value representative of an effective bit). In the step of deciding an address, an address signal for accessing the data memory is decided by attaching the page address to the retrieved memory address. Therefore, there is no limit on the bit of the page address as in the conventional technique, and the memory space can be divided into pages for effective use. In this case, an operation as in the conventional technique is not required. As a result, there can be provided a data-driven type information processing apparatus allowing for the effective use of memory without reducing the processing speed.

More preferably, the step of deciding an address includes the step of deciding an address for accessing the data memory by attaching the page address included in the data packet to the high order in the retrieved effective data.

In accordance with the present invention, the page address can be attached to the high order in the memory address that is the retrieved effective data. The data memory can be accessed with the page address of the upper bit and the address of the lower bit in the address signal.

More preferably, the step of deciding an address includes the step of deciding an address for accessing the data memory by adding a page address included in the data packet to the retrieved effective data.

In accordance with the present invention, the page address can be added to the memory address that is the retrieved effective data. There is no limit on the number of bits resulting from the number of bits of the page address added to the number of bits of the memory address. Therefore, the memory space can be used more effectively.

More preferably, the step of retrieving effective data includes the steps of generating mask data for masking a specific bit of the data included in the data packet based on the set value, and retrieving effective data from the data included in the data packet based on the mask data.

In accordance with the present invention, for example, a thermometer type decoder outputs a 15-bit mask value in accordance with a predetermined rule for a 4-bit set value. Based on this mask value, the memory address is retrieved.

More preferably, the data packet is configured with an instruction code region, a node region, a generation number region, a page address region, a data region, and an effective bit set value storing region.

In accordance with the present invention, the data packet in the data-driven type information processing apparatus is usually configured with an instruction code region, a node region, a generation number region, a page address region, and a data region. An address signal for accessing the data memory is decided by using the data packet having an effective bit set value storing region added to this configuration, and attaching a page address to a memory address retrieved based on a set value included in an effective bit set value. Therefore, the memory can effectively be used without reducing the processing speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a block diagram of the address generating unit of the data-driven type information processing apparatus in accordance with a second embodiment of the present invention.

FIG. 11 is a diagram showing a packet configuration of the input data packet and a configuration of the address signal in accordance with the second embodiment of the present invention.

DESCRIPTION OF THE PREFERRED EMBODIMENTS

Figure 1:
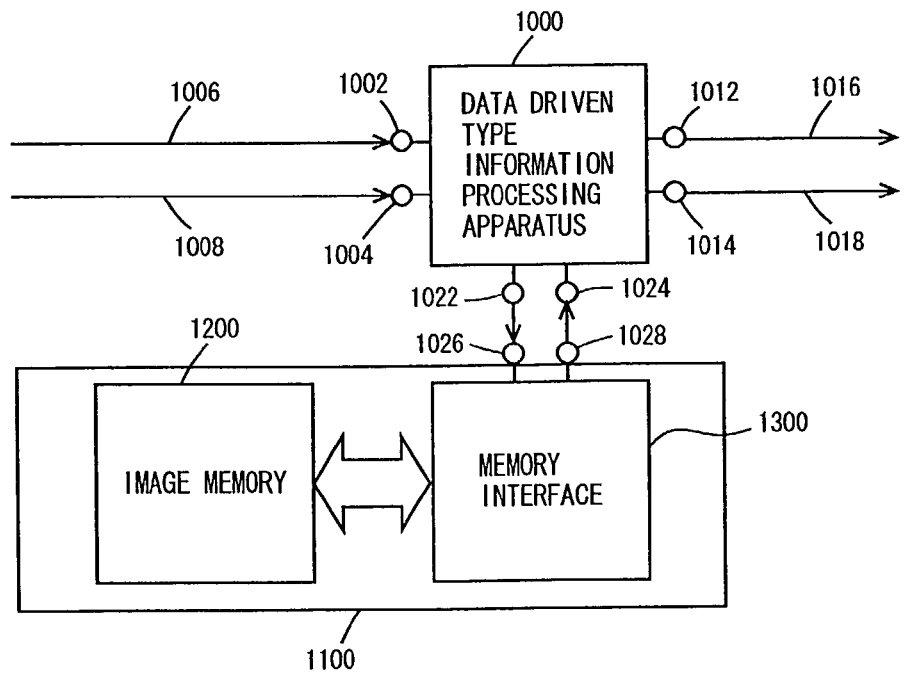
FIG. 1 is a diagram showing a system configuration including a data-driven type information processing apparatus.
Figure 2:
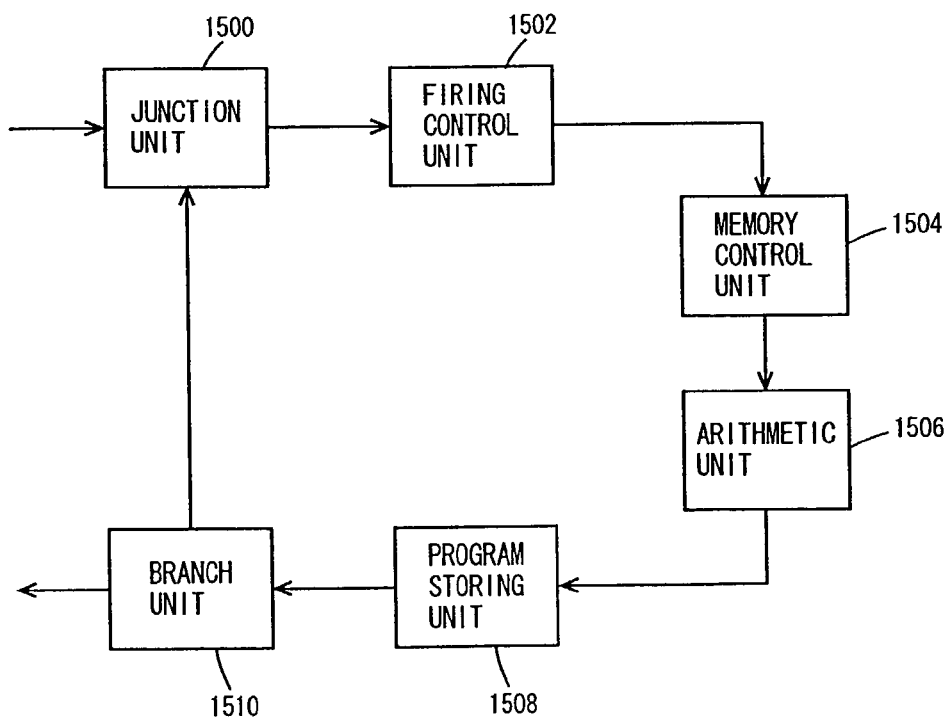
FIG. 2 is a diagram showing an internal configuration of the data-driven type information processing apparatus.
Figure 3:
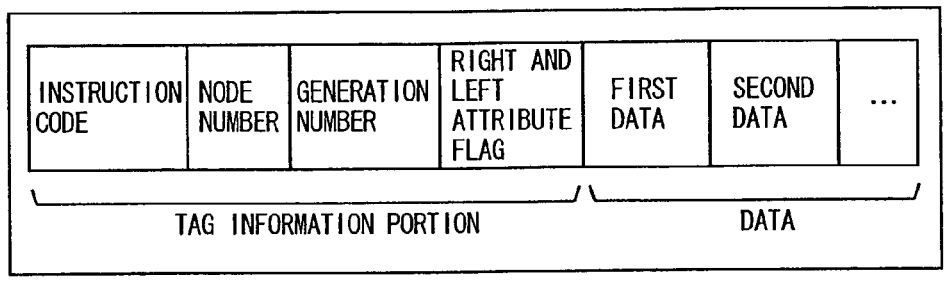
FIGS. 3 and 4 are diagrams showing packet configurations of an input data packet for illustrating a related technique.
Figure 4:
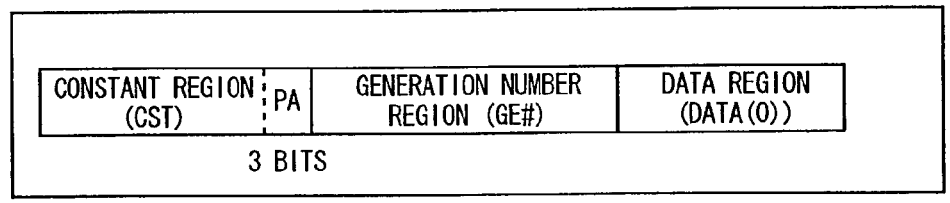
Figure 5:
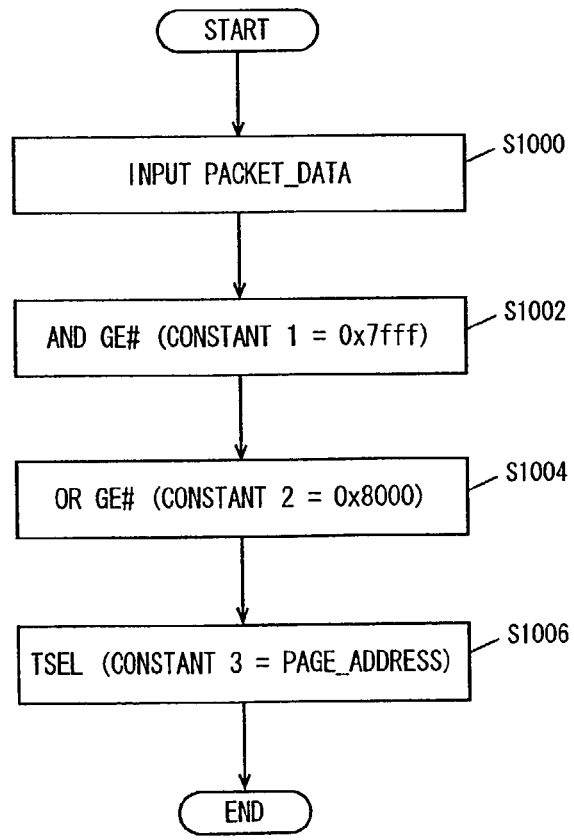
FIG. 5 is a flowchart showing a control structure of a program executed in an address generating unit in the related technique.
Figure 6:
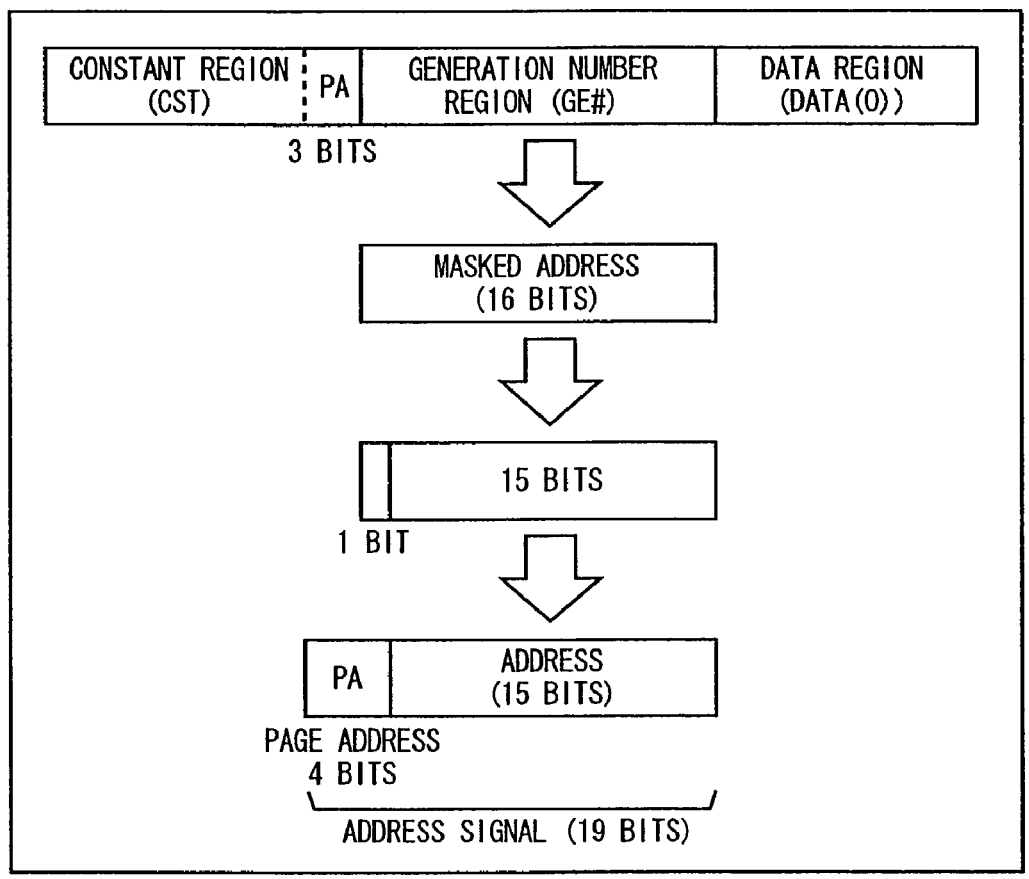
FIG. 6 is a diagram showing a packet configuration of the input data packet and a configuration of an address signal in the related technique.

The embodiments of the present invention will be described with reference to the figures in the following. In the following description, the same components will be denoted with the same reference characters. They have the same designations and functions. Therefore description thereof will not be repeated.

(First Embodiment)

Figure 7:
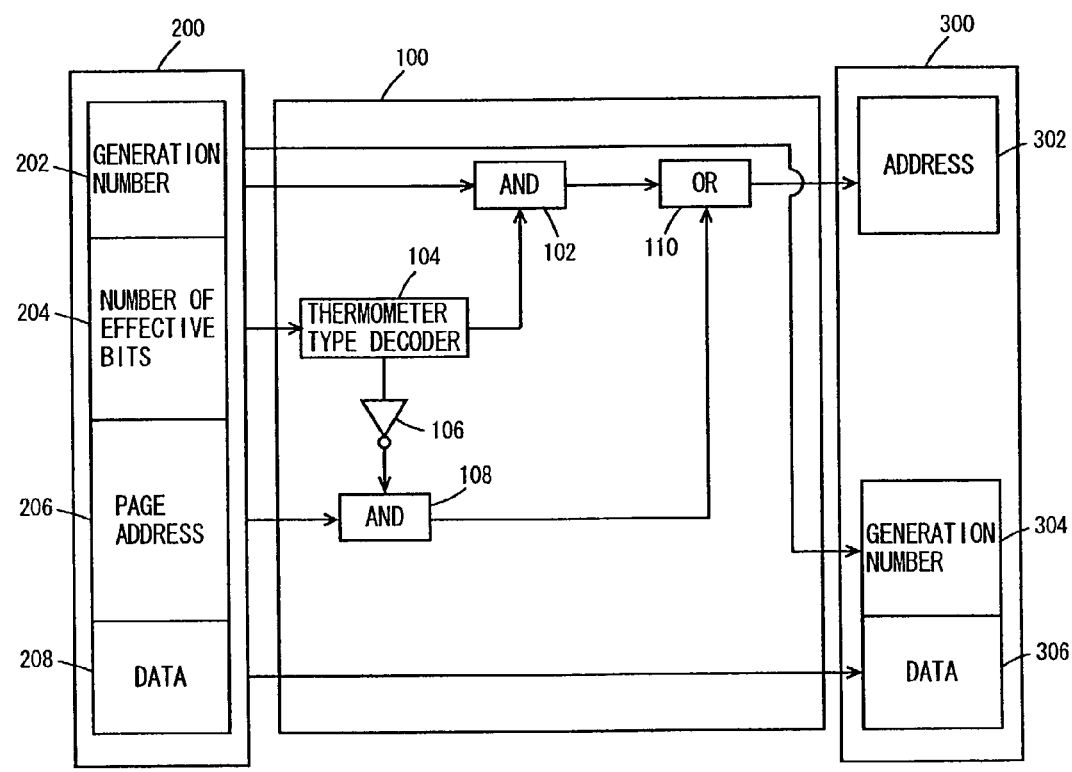
FIG. 7 is a block diagram of an address generating unit in a data-driven type information processing apparatus in accordance with a first embodiment of the present invention.

Referring to FIG. 7, an address generating unit 100 in accordance with the present embodiment will be described. This address generating unit 100 is provided within a memory control unit 1504 of a data-driven type information processing apparatus 1000. Address generating unit 100 executes an operation on an input data packet stored in a pipeline register 200, and generates and outputs an address signal to an output register 300.

Address generating unit 100 includes a thermometer type decoder 104 calculating a mask value based on the number of effective bits stored in pipeline register 200, an AND operation unit 102 executing an AND operation of a generation number and a mask value, an inverter 106 inverting the mask value, an AND operation unit 108 executing an AND operation of the inverted mask value and a page address, and an OR operation unit 110 executing an OR operation of the output from AND operation unit 102 and the output from AND operation unit 108.

Thermometer type decoder 104 outputs 15-bit data in accordance with a predetermined rule, for example, when four-bit data is input. This input/output data will be described later.

This address generating unit 100 sets the number of upper bits (bits storing an address for a page address) of an address for accessing internal memory such as image memory based on the number of effective bits. In the present embodiment, it is assumed that the number of bits obtained by adding the number of bits of the page address to the number of bits of the address except the page address is constant irrespective of the number of effective bits.

It is noted that in the following description, the number of effective bits is stored in the input data packet and decoded to a mask value in thermometer type decoder 104 for generating an address based on the decoded mask value, by way of illustration, although the present invention is not limited thereto. For example, the mask value may be stored in the input data packet and an address may be generated using the mask value stored in the input data packet, not decoded by thermometer type decoder 104.

Figure 8:
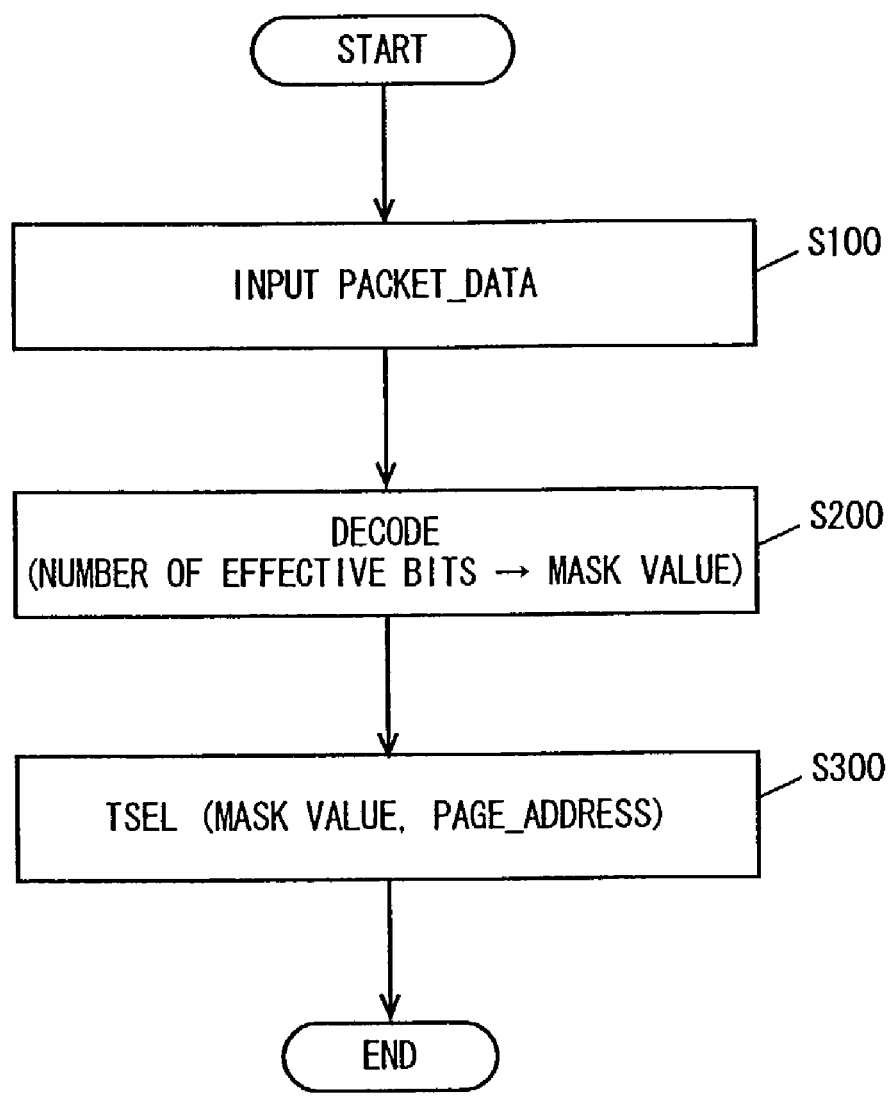
FIG. 8 is a flowchart showing a control structure of a program executed in the address generating unit shown in FIG. 7.

Referring to FIG. 8, a program executed in address generating unit 100 in accordance with the present embodiment has the following control structure.

At S100, address generating unit 100 detects the input of the input data packet and stores the input data packet in pipeline register 200. Here, the stored input data packet includes a generation number storing region 202, an effective bit count storing region 204, a page address storing region 206, and a data storing region 208, as shown in FIG. 7. The number of effective bits stored in effective bit count storing region 204 and the page address stored in page address storing region 206 are predetermined constants.

Figure 9:
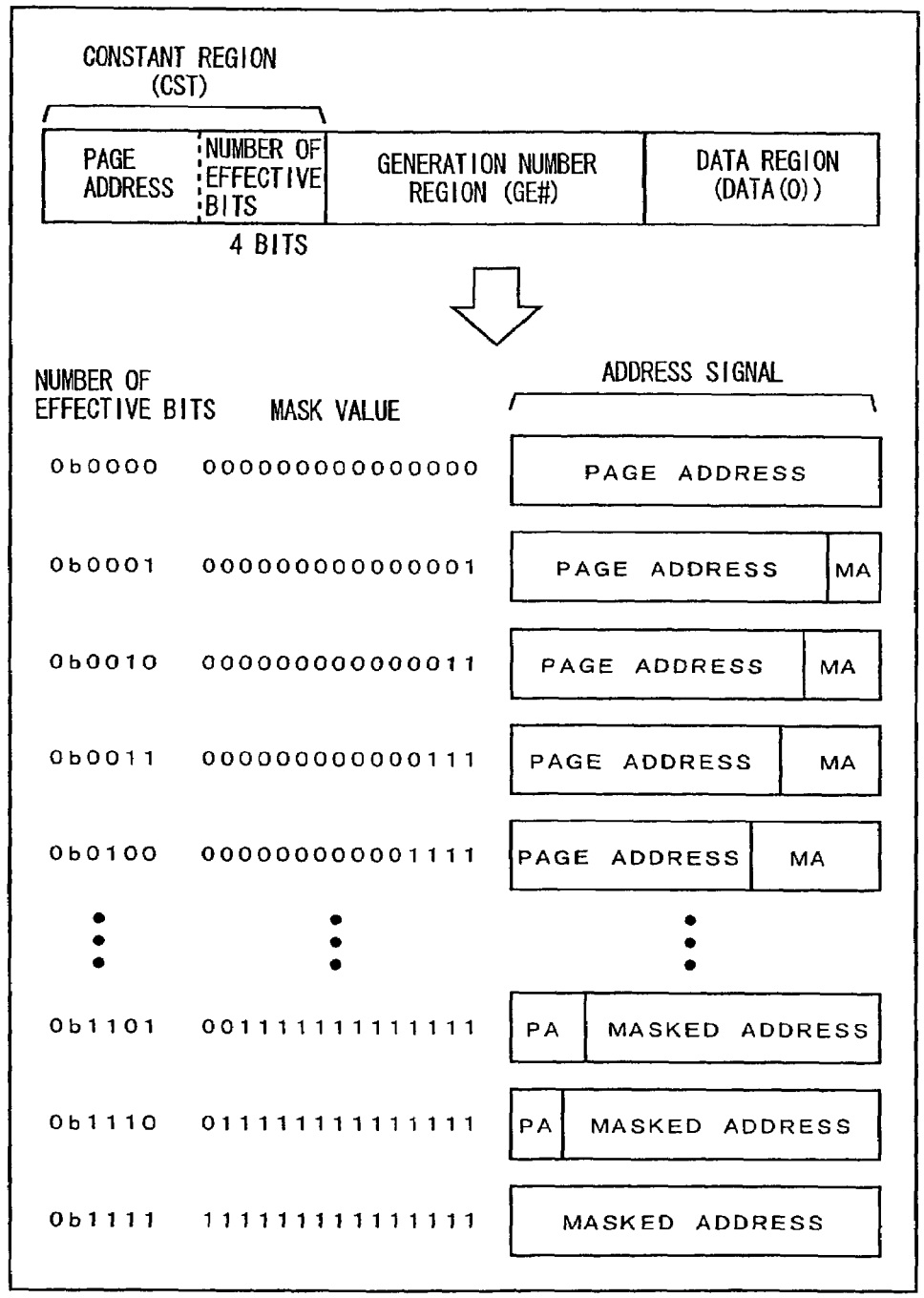
FIG. 9 is a diagram showing a packet configuration of an input data packet and a configuration of an address signal in accordance with the first embodiment of the present invention.

At S200, address generating unit 100 converts the number of effective bits to a mask value using thermometer type decoder 104. Here, when the number of effective bits of 4 bits is input to thermometer decoder 104, a 15-bit mask value as shown in FIG. 9 is output. When the number of effective bits "0100" is input to thermometer type decoder 104, a mask value of "000000000001111" is output.

At S300, address generating unit 100 executes an AND operation of the mask value output from thermometer type decoder 104 and a generation number (GE#) using AND operation unit 102. Address generating unit 100 inverts the bits of the mask value output from thermometer type decoder 104 using inverter 106. Address generating unit 100 executes an AND operation of the bit-inverted mask value and the page address using AND operation unit 108. Address generating unit 100 executes an OR operation of the output from AND operation unit 102 and the output from AND operation unit 108 using OR operation unit 110. Address generating unit 100 stores the output from OR operation unit 110 into an address storing region 302 of an output register 300. It is noted that a generation number storing region 304 of the output register stores the generation number (GE#) stored in generation number storing region 202 of pipeline register 200. Furthermore, a data storing region 306 of the output register stores data (DATA(0)) stored in data storing region 208 of pipeline register 200.

The operation of address generating unit 100 based on the above structure and flowchart will be described.

The number of effective bits of the input data packet stored in pipeline register 200 is input into thermometer type decoder 104 for generating a mask value (S200). If the number of effective bits is "0000", for example, "000000000000000" is output as a mask value from thermometer type decoder 104. AND operation unit 102 executes an AND operation of this mask value and the generation number (GE#). If the mask value is "000000000000000", data having all bits forced to be "0" is output from AND operation unit 102.

AND operation unit 108 executes an AND operation of data having the mask value of which bits are inverted by inverter 106 and the page address. If the mask value is "000000000000000", data having all bits unchanged is output from AND operation unit 108.

OR operation unit 110 executes an OR operation of the data output from AND operation unit 102 and the data output from AND operation unit 108. If the mask value is "000000000000000", as shown in FIG. 9, an address signal for accessing the memory will be data in which all of the bits represents a page address.

Furthermore, if the number of effective bits is "0001", the mask value will be "000000000000001", and the AND operation of this mask value and the generation number (GE#) is executed. In this case, data having bits being forced to be "0" except the least significant bit is output from AND operation unit 102. The least significant bit is data corresponding to the least significant bit of the generation number (GE#). The AND operation of data having the inverted bits of this mask value and the page address is executed. In this case, data having the least significant bit of the page address being forced to be "0" is output from AND operation unit 108. The bits except the least significant bit is data corresponding to the bits except the least significant bit of the page address. The OR operation of the data output from AND operation unit 102 and the data output from AND operation unit 108 is executed. Here, as shown in FIG. 9, the address signal for accessing the memory is data in which the least significant bit corresponds to the least significant bit of the generation number (GE#) and the bits except the least significant bit correspond to the bits except the least significant bit of the page address.

Furthermore, if the number of effective bits is "0010", the mask value will be "000000000000011", and the AND operation of this mask value and the generation number (GE#) is executed. Here, data having bits being forced to be "0" except the least-significant to second-least-significant bits is output from AND operation unit 102. The least-significant to second-least-significant bits are data corresponding to the least-significant to second-least-significant bits of the generation number (GE#). The AND operation of the data having the inverted bits of the mask value and the page address is executed. In this case, data having the least-significant to second-least-significant bits of the page address being forced to be "0" is output from AND operation unit 108. The bits except the least-significant to second-least-significant bits are data corresponding to the bits except the least-significant to second-least-significant bits of the page address. The OR operation of the data output from AND operation unit 102 and the data output from AND operation unit 108 is executed. Here, as shown in FIG. 9, the address signal for accessing the memory is data in which the least-significant to second-least-significant bits correspond to the least-significant to second-least-significant bits of the generation number (GE#) and the other bits correspond to the bits except the least-significant to second-least-significant bits of the page address.

As described above, the number of effective bits enables flexible setting of the number of bits for specifying the page address of the address signal and the number of bits for specifying the memory region within the page. As a result, when memory is shared in one program or memory is shared among a plurality of programs, the number of pages used in the program and the memory region within the page can be used effectively by setting an appropriate number of effective bits or mask value.

(Second Embodiment)

In the following, a second embodiment of the present invention will be described. In the following description, the same configurations as the first embodiment described above will be denoted with the same reference characters and have the same functions. Therefore detailed description thereof will not be repeated.

Referring to FIG. 10, an address generating unit 120 in accordance with the present embodiment will be described. This address generating unit 120 is provided within memory control unit 1504 of data-driven type information processing apparatus 1000. Address generating unit 120 differs from address generating unit 100 in accordance with the first embodiment described above in configuration in that it does not have inverter 106, AND operation unit 108 and OR operation unit 110 but has an adder 122.

Adder 122 adds the output from AND operation unit 102 to page address 206. The result of the operation is stored in address storing region 310 of output register 300.

Address generating unit 120 is the same as the first embodiment described above in that the upper bit (the bit storing an address for a page address) of the address for accessing internal memory such as image memory is set based on the number of effective bits. In the present embodiment, however, it is assumed that the number of bits obtained by adding the number of bits of the page address to the number of bits of the address except the page address is not constant.

A program executed in address generating unit 120 in accordance with the present embodiment has the following control structure. It is noted that a flowchart of the program executed in address generating unit 120 in accordance with the present embodiment is the same as the first embodiment described above except the content of the process at S300.

At S300, address generating unit 120 executes an AND operation of the mask value output from thermometer type decoder 104 and the generation number (GE#) using AND operation unit 102. Address generating unit 120 executes an addition operation of the output from AND operation unit 102 and the page address using adder 122. Address generating unit 120 stores the output from adder 122 into address storing region 302 of output register 300.

Accordingly, data corresponding to the bits specified by the number of effective bits is retrieved from the generation number (GE#) and added to the page address, for generating an address signal.

The operation of address generating unit 120 based on the above structure and flowchart will be described.

The number of effective bits of the input data packet stored in pipeline register 200 is input into thermometer type decoder 104 for generating a mask value (S200). If the number of effective bits is "0001", for example, "000000000000001" is output as a mask value from thermometer type decoder 104. AND operation unit 102 executes an AND operation of the mask value and the generation number (GE#). If the mask value is "000000000000001", data having the bits being forced to be "0" except the least significant bit is output from AND operation unit 102. The least significant bit is data corresponding to the least significant bit of the generation number (GE#). Adder 122 adds the data output from AND operation unit 102 to the page address. In this case, as shown in FIG. 11, the address signal for accessing the memory is data having the least significant bit of the generation number (GE#) added to the page address.

Furthermore, if the number of effective bits is "1011", "000011111111111" is output as a mask value from thermometer type decoder 104. AND operation unit 102 executes the AND operation of this mask value and the generation number (GE#). If the mask value is "000011111111111", data having the bits being forced to be "0" except the least-significant to eleventh-least-significant bits is output from AND operation unit 102. The least-significant to eleventh-least-significant bits are data corresponding to the least-significant to eleventh-least-significant bits of the generation number (GE#). Adder 122 adds the data output from AND operation unit 102 to the page address. Here, as shown in FIG. 11, the address signal for accessing the memory is data corresponding to the data of the least-significant to eleventh-least-significant bits of the generation number (GE#) added to the page address.

As described above, the number of effective bits enables flexible setting of the number of bits for specifying the page address of the address signal and the number of bits for specifying a memory region within a page. In particular, the address generating unit in accordance with the present embodiment has the following effect in addition to that of the first embodiment described above.

In the first embodiment, a memory region from address 0 to address ($2^{10}-1$) is set within one page irrespective of data amount by setting the upper five bits of the address signal to bits for specifying a page address and by setting the lower ten bits of the address signal to bits for specifying an address within a page. Here, since the data amount for each page is not necessarily $2^{10}$, an unused region may exist in the memory region as being set.

In the second embodiment, an address signal is generated by adding an address masked with a mask value to a 15-bit page address. This address signal uses the page address as a top address for setting a memory region. If "1011" is set as the number of effective bits, an AND operation causes the least-significant to eleventh-least-significant bits of a generation number to be set as an effective address. If the page address is formed of 15 bits and data stored in that page is $2^8+1$, a memory region is available from the top address "000000000000000" to address "000000010000000" for this page address. By setting the next page such that $2^8+1$ data region from the top address "000000010000001" can be secured without overlapping with another page, a memory region can be set without being limited to address $2^n$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data-driven type information processing apparatus comprising at least a paired data generating unit, a memory control unit and data memory, wherein
    said memory control unit includes an input circuit inputting a data packet output from said paired data generating unit,
    said data packet including a page address, a set value for setting an effective bit and data,
    a processing circuit connected to said input circuit for retrieving effective data from the data included in said data packet based on said set value, and
    a decision circuit connected to said processing circuit for deciding an address for accessing said data memory by attaching the pane address included in said data packet to said retrieved effective data, wherein
    said decision circuit includes a circuit deciding an address for accessing said data memory by attaching the page address included in said data packet to the high order in said retrieved effective data.

2. The data-driven type information processing apparatus according to claim 1, wherein
    said decision circuit includes a circuit deciding an address for accessing said data memory by adding the page address included in said data packet to said retrieved effective data.

3. The data-driven type information processing apparatus of claim 1 wherein said set value comprises the number of bits in the page address.

4. A data-driven type information processing apparatus comprising at least a paired data generating unit, a memory control unit and data memory, wherein
    said memory control unit includes an input circuit inputting a data packet output from said paired data generating unit,
    said data packet including a page address, a set value for setting an effective bit and data,
    a processing circuit connected to said input circuit for retrieving effective data from the data included in said data packet based on said set value, and
    a decision circuit connected to said processing circuit for deciding an address for accessing said data memory by attaching the page address included in said data packet to said retrieved effective data, wherein
    said processing circuit includes a circuit generating mask data for masking a specific bit of the data included in said data packet based on said set value, and a circuit retrieving effective data from the data included in said data packet based on said mask data.

5. A data-driven type information processing apparatus comprising at least a paired data generating unit, a memory control unit and data memory, wherein
    said memory control unit includes an input circuit inputting a data packet output from said paired data generating unit,
    said data packet including a page address, a set value for setting an effective bit and data,
    a processing circuit connected to said input circuit for retrieving effective data from the data included in said data packet based on said set value, and
    a decision circuit connected to said processing circuit for deciding an address for accessing said data memory by attaching the page address included in said data packet to said retrieved effective data, wherein
    said data packet is configured with an instruction code region, a generation number region, a page address region, a data region, and an effective bit set value storing region.

6. A data-driven type information processing apparatus comprising at least a paired data generating unit, a memory control unit and data memory, wherein
    said memory control unit includes input means for inputting a data packet output from said paired data generating unit,
    said data packet including a page address, a set value for setting an effective bit and data,
    processing means connected to said input means for retrieving effective data from the data included in said data packet based on said set value, and
    decision means connected to said processing means for deciding an address for accessing said data memory by attaching the page address included in said data packet to said retrieved effective data, wherein
    said decision means includes means for deciding an address for accessing said data memory by attaching the page address included in said data packet to the high order in said retrieved effective data.

7. The data-driven type information processing apparatus according to claim 6, wherein
    said decision means includes means for deciding an address for accessing said data memory by adding the page address included in said data packet to said retrieved effective data.

8. The data-driven type information processing apparatus of claim 6 wherein said set value comprises the number of bits in the page address.

9. A data-driven type information processing apparatus comprising at least a paired data generating unit, a memory control unit and data memory, wherein said memory control unit includes input means for inputting a data packet output from said paired data generating unit, said data packet including a page address, a set value for setting an effective bit and data, processing means connected to said input means for retrieving effective data from the data included in said data packet based on said set value, and decision means connected to said processing means for deciding an address for accessing said data memory by attaching the page address included in said data packet to said retrieved effective data, wherein said processing means includes means for generating mask data for masking a specific bit of the data included in said data packet based on said set value, and means for retrieving effective data from the data included in said data packet based on said mask data.

10. A data-driven type information processing apparatus comprising at least a paired data generating unit, a memory control unit and data memory, wherein said memory control unit includes input means for inputting a data packet output from said paired data generating unit, said data packet including a page address, a set value for setting an effective bit and data, processing means connected to said input means for retrieving effective data from the data included in said data packet based on said set value, and decision means connected to said processing means for deciding an address for accessing said data memory by attaching the page address included in said data packet to said retrieved effective data, wherein said data packet is configured with an instruction code region, a generation number region, a page address region, a data region, and an effective bit set value storing region.

11. An information processing method in a memory control unit of a data-driven type information processing apparatus including at least a paired data generating unit, said memory control unit and data memory, comprising the steps of:

inputting a data packet output from said paired data generating unit, said data packet including a page address, a set value for setting an effective bit and data;

retrieving effective data from the data included in said input data packet based on said set value; and deciding an address for accessing said data memory by attaching the page address included in said data packet to said retrieved effective data, wherein said step of deciding an address includes the step of deciding an address for accessing said data memory by attaching the page address included in said data packet to the high order in said retrieved effective data.

12. The information processing method according to claim 11, wherein said step of deciding an address includes the step of deciding an address for accessing said data memory by adding the page address included in said data packet to said retrieved effective data.

13. The information processing method of claim 11 wherein said set value comprises the number of bits in the page address.

14. An information processing method in a memory control unit of a data-driven type information processing apparatus including at least a paired data generating unit, said memory control unit and data memory, comprising the steps of:

inputting a data packet output from said paired data generating unit, said data packet including a page address, a set value for setting an effective bit and data;

retrieving effective data from the data included in said input data packet based on said set value; and deciding an address for accessing said data memory by attaching the page address included in said data packet to said retrieved effective data, wherein said step of retrieving effective data includes the steps of generating mask data for masking a specific bit of the data included in said data packet based on said set value, and retrieving effective data from the data included in said data packet based on said mask data.

15. An information processing method in a memory control unit of a data-driven type information processing apparatus including at least a paired data generating unit, said memory control unit and data memory, comprising the steps of:

inputting a data packet output from said paired data generating unit, said data packet including a page address, a set value for setting an effective bit and data;

retrieving effective data from the data included in said input data packet based on said set value; and deciding an address for accessing said data memory by attaching the page address included in said data packet to said retrieved effective data, wherein said data packet is configured with an instruction code region, a generation number region, a page address region, a data region, and an effective bit set value storing region.

* * * * *